(12) United States Patent
Sjöö

(10) Patent No.: US 8,534,962 B2
(45) Date of Patent: Sep. 17, 2013

(54) CUTTING TOOL

(75) Inventor: Sture Sjöö, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 404 days.

(21) Appl. No.: 12/911,358

(22) Filed: Oct. 25, 2010

(65) Prior Publication Data

US 2011/0103903 A1    May 5, 2011

(30) Foreign Application Priority Data

Oct. 30, 2009  (SE) .................................... 0950808-6

(51) Int. Cl.
   *B23C 5/20*  (2006.01)

(52) U.S. Cl.
   USPC ................................. 407/46; 407/59; 407/34

(58) Field of Classification Search
   CPC ..................................... B23C 5/20; B23C 5/22
   USPC .................... 407/53, 59, 58, 34, 46
   See application file for complete search history.

(56) References Cited

U.S. PATENT DOCUMENTS

| | | | | |
|---|---|---|---|---|
| 1,410,350 A | * | 3/1922 | Smith et al. | 407/39 |
| 3,091,138 A | * | 5/1963 | Berry, Jr. | 408/232 |
| 3,855,680 A | * | 12/1974 | Wirefelt | 407/34 |
| 4,204,787 A | * | 5/1980 | McCray et al. | 409/234 |
| 5,425,603 A | * | 6/1995 | Dutschke et al. | 407/40 |
| 5,551,811 A | * | 9/1996 | Satran et al. | 407/40 |
| 5,607,263 A | * | 3/1997 | Nespeta et al. | 407/61 |
| 5,800,098 A | | 9/1998 | Satran et al. | |
| 2004/0213642 A1 | * | 10/2004 | Pantzar | 409/234 |
| 2005/0232710 A1 | * | 10/2005 | Schafer et al. | 407/47 |
| 2009/0226268 A1 | * | 9/2009 | Pilkington | 407/113 |
| 2010/0242696 A1 | * | 9/2010 | Digernes et al. | 83/169 |

FOREIGN PATENT DOCUMENTS

| | | |
|---|---|---|
| DE | 19600636 A1 * | 12/1997 |
| DE | 102 55 270 A1 | 6/2004 |
| WO | 2008/002145 | 1/2008 |

* cited by examiner

*Primary Examiner* — Daniel Howell
*Assistant Examiner* — Ryan Rufo
(74) *Attorney, Agent, or Firm* — Morgan, Lewis & Bockius LLP (57) ABSTRACT

Tool for chip removing machining, including a primary tool part and a secondary tool part. The primary tool part includes a primary connecting surface, an opposite surface, a recess that extends from the primary connecting surface toward the opposite surface, and a wall section between a bottom surface of the recess and the opposite surface. The secondary tool part includes a secondary connecting surface, a protuberance that extends from the secondary connecting surface and, in a mounted state, into the recess, the protuberance having an end surface that, in the mounted state, faces the bottom surface of the recess. A fastening element, which, by a contractive force in the mounted state, connects the wall section with the protuberance. The wall section is elastically flexible and, in the mounted state, bent toward the end surface of the protuberance by the contractive force of the fastening element.

16 Claims, 5 Drawing Sheets

CUTTING TOOL

This application claims priority under 35 U.S.C. §119 to Swedish Patent Application No. 0950808-6, filed on Oct. 30, 2009, which is incorporated by reference herein in its entirety.

FIELD OF THE INVENTION

The present invention relates generally to tools for cutting machining and more precisely chip removing machining of metal. The invention particularly relates to rotary tools, such as a milling tool including so-called Long Edge Milling Cutters, Helical End Mills, and Extended Flute End Mills.

BACKGROUND OF THE INVENTION

Such tools, especially provided with a plurality of cutting inserts distributed around the periphery of the tool and distributed along the longitudinal center axis of the tool, are expensive and complicated to manufacture. These tools include a large number of seats for the cutting inserts. If such a seat is broken, in the worst case, the entire tool has to be replaced. Especially those cutting inserts and seats that are situated at the front end of the tool are subjected to great stresses during use of the tool.

This problem can be solved by the tool being divided into at least two coupled tool parts, a main body connected with the shaft of the tool and an end body that is interconnected with the main body in a detachable way. If a seat of a tool part is broken, it is enough to exchange this tool part. Such dividable tools are shown in U.S. Pat. No. 5,800,098 and in U.S. Pat. No. 5,551,811.

U.S. Pat. No. 5,551,811 shows a tool for cutting machining, including a primary tool part, a secondary tool part and a shaft part that is formed for fixing in a machine tool. The primary tool part has a primary connecting surface and an opposite surface toward the shaft part as well as a recess that extends from the primary connecting surface toward the opposite surface. The primary tool part has a wall section between a bottom surface of the recess and the opposite surface. The secondary tool part has a secondary connecting surface and a protuberance that extends axially from the secondary connecting surface and, in a mounted state, into the recess. The protuberance has an end surface that, in the mounted state, faces the bottom surface. A relatively long fixing screw connects, by a contractive force, the wall section with the protuberance in the mounted state. A center axis extends in a longitudinal direction of the tool through the primary tool part and the recess thereof, through the secondary tool part and the protuberance thereof as well as through the shaft part. The primary and secondary tool parts comprise respective seats formed for the receipt of a cutting insert each.

U.S. Pat. No. 5,607,263 shows another cutting tool having a detachable tool head wherein the cutting inserts are an integrated part of the cutting head.

However, there are several problems with dividable tools, especially in the coupling that connects the primary tool part with the secondary tool part. The temperature differences that arise between the tool parts during use of the tool may lead to dimensional changes and the primary tool part moving in relation to the secondary tool part. The stresses and vibrations that occur when using the tool may lead to the utilized coupling elements, such as fixing screws or the like, coming loose. The coupling between the tool parts is often bulky and interferes with the possibility of arranging other tool components on or in the tool, for instance, a damping mechanism. The mounting and dismounting of the tool parts are a complicated and time-consuming working operation. The manufacture of the tool is complicated by the fact that it includes two tool parts each one of which requires a special design for the interconnection of the tool parts.

An object of the invention is to provide a tool of the type indicated, by which the above mentioned problems, or at least some of the above mentioned problems, can be obviated or reduced.

SUMMARY OF THE INVENTION

An object is achieved by a tool of the type indicated and that the wall section is elastically flexible and, by the contractive force in the mounted state, bent toward the end surface. By such an elastic wall section, accordingly a contractive force is provided that exerts a prestress on the fastening element, which contributes to the fastening element being reliably secured. The prestress prevents the fastening element from coming loose even if the tool vibrates during use. Due to the elastic wall section, a relatively short fastening element, for instance, a relatively short fixing screw having a short length extension, can thus be used because the fastening element does not need to have any inherent elasticity. Thus, space can be saved in the longitudinal direction of the tool. Temperature differences during use of the tool can be mastered in an advantageous way. Due to the elastic wall section, the tool parts will be pressed against each other under all operation conditions, i.e., in all temperatures occurring in use. Thereby, it is avoided that the fastening element comes loose, or is poorer secured, as a consequence of expansion or contraction of the material in the tool parts because of temperature variations.

The primary and secondary tool parts can be mounted and dismounted in a simple way by the fastening element that, for instance, may be a fixing screw that extends through the wall section and into a thread of the protuberance. Thus, one of the tool parts can quickly and simply be replaced in the event of rupture and the other non damaged tool part can be kept.

In an embodiment, the invention provides a tool for chip removing machining, including a primary tool part and a secondary tool part. The primary tool part includes a primary connecting surface, an opposite surface, a recess that extends from the primary connecting surface toward the opposite surface, and a wall section between a bottom surface of the recess and the opposite surface. The secondary tool part includes a secondary connecting surface, a protuberance that extends from the secondary connecting surface and, in a mounted state, into the recess, the protuberance having an end surface that, in the mounted state, faces the bottom surface of the recess. A shaft part is for fixing in a machine tool. A fastening element, which, by a contractive force in the mounted state, connects the wall section with the protuberance. A center axis extends in a longitudinal direction of the tool through the primary tool part, the recess, the secondary tool part, the protuberance, and the shaft part. An insert seat is formed in at least one of the primary tool part and the secondary tool part for receiving a cutting insert. The wall section is elastically flexible and, in the mounted state, bent toward the end surface of the protuberance by the contractive force of the fastening element.

According to one embodiment of the invention, the primary tool part and the secondary tool part are dimensioned in such a way that there is formed a first gap between the end surface and the bottom surface in the mounted state. In such a way, it is guaranteed that the elastic wall section can move toward and from the end surface of the protuberance.

According to one embodiment of the invention, the protuberance has a circumference surface that tapers toward the end surface and the recess a corresponding inner surface that tapers toward the bottom surface, the circumference surface and the inner surface forming an angle α with the center axis. Such a tapering, or conical, design of the circumference surface and the inner surface also contributes to a reliable mounting of the two tool parts to each other. Advantageously, the angle α may be ≦10°, preferably ≧2° and ≦7°, more preferably ≧3° and ≦6°.

According to one embodiment of the invention, the primary connecting surface, in the mounted state, faces the secondary connecting surface, the primary tool part and the secondary tool part being dimensioned in such a way that a second gap is formed between the primary connecting surface and the secondary connecting surface in the mounted state. Due to this design, with the first gap and the second gap, the two tool parts will abut against each other only by the tapering or conical circumference surface of the protuberance and the tapering or conical inner surface of the recess. Thus, the second gap contributes to a reliable interconnection of the two tool parts. Furthermore, the second gap in co-operation with the elastic wall section contributes to somewhat reduced tolerance requirements of the tool parts, and more precisely of the two connecting surfaces, the circumference surface of the protuberance and the inner surface of the recess. Due to the lower tolerance requirements, the manufacture can be facilitated and made in one or more machine operations in one and the same set-up. No finishing in the form of grinding or the like is required for the completion of the tool parts and the surfaces thereof.

According to one embodiment of the invention, the protuberance and the recess have a non-circular shape in a cross-section in respect of the center axis. In such a way, the position of the primary tool part in a circumferential direction in relation to the secondary tool part can be determined and ensured during use of the tool. Advantageously, the non-circular shape may comprise a polygon-like shape, for instance, a triangle-like shape.

According to one embodiment of the invention, the fastening element includes a screw, which extends through an opening of the wall section and is in engagement with a threaded hole of the protuberance. Such a screw guarantees a simple mounting and dismounting of the two tool parts. The screw may advantageously be relatively short, as was mentioned above, for instance, having a length/diameter ratio of 1/1-4/1.

According to one embodiment of the invention, the opening of the wall section is provided with an internal thread, which has a diameter that is greater than the diameter of the threaded hole and which is formed for the receipt of a puller screw. Thus, upon dismounting of the tool parts, the fixing screw can be removed in a first step. In a second step, the puller screw is screwed into the internal thread of the wall section into abutment against the protuberance, tightening of the puller screw resulting in the two tool parts being displaced from each other and accordingly dismounted. Advantageously, the protuberance has an abutment surface arranged around the threaded hole and formed to form abutment surface the puller screw.

According to one embodiment of the invention, the shaft part is formed integrally with or connected with the secondary tool part.

According to one embodiment of the invention, the secondary tool part includes a central cavity formed for the receipt of a damping mechanism. It is technically advantageous if the damping mechanism can be applied as far forward as possible in the tool, i.e., as near the opposite surface of the primary tool part as possible. In this embodiment, this surface forms the distal end surface of the tool that is located where the maximum deflection occurs during use of the tool. Because the primary tool part has a relatively thin wall section and because the fixing screw can be made relatively short, the central cavity can extend far forward in the tool, which allows the damping mechanism to be positioned in the vicinity of the distal end surface.

According to one embodiment of the invention, the tool includes a cooling medium duct that extends through at least the cavity and out through an opening through the end surface. Thus, this opening mouths in the first gap and can from there be run further toward the cutting inserts or areas that are to be cooled.

According to one embodiment of the invention, the primary tool part includes at least one set of seats formed for the receipt of a cutting insert each and distributed around a circumference surface of the primary tool part.

According to an additional embodiment of the invention, the secondary tool part includes at least one set of seats formed for the receipt of a cutting insert each and distributed around a circumference surface of the secondary tool part.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

FIGS. 1-7 show a cutting tool for chip removing machining of metal according to a first embodiment. The tool includes a primary tool part 1, a secondary tool part 2 and a shaft part 3. In the first embodiment shown, the primary tool part 1 forms an end body while the secondary tool part 2 forms an intermediate tool body between the end body and the shaft part 3. The shaft part 3 is formed for direct fixing in a machine tool (not shown) or fixing via an extension element (not shown). The shaft part 3 may be an integrated part of the secondary tool part 2 or be detachably connected with the secondary tool part 2.

A center axis x extends in a longitudinal direction of the tool through the primary tool part 1, the secondary tool part 2 and the shaft part 3. In the first embodiment shown, the center axis x forms also the rotation axis of the tool.

In the embodiments shown, the tool is a rotary tool to be fixed in a machine tool. The tool shown in FIGS. 1-7 is a milling tool and more precisely a so-called Long Edge Milling Cutter, Helical End Mill or Extended Flute End Mill. However, it should be noted that the invention is not in any way limited to this type of tools but is applicable to all possible types of rotary tools including different milling and drilling tools. It is also possible to apply the invention to stationary tools, for instance, turning tools.

Figure 1:
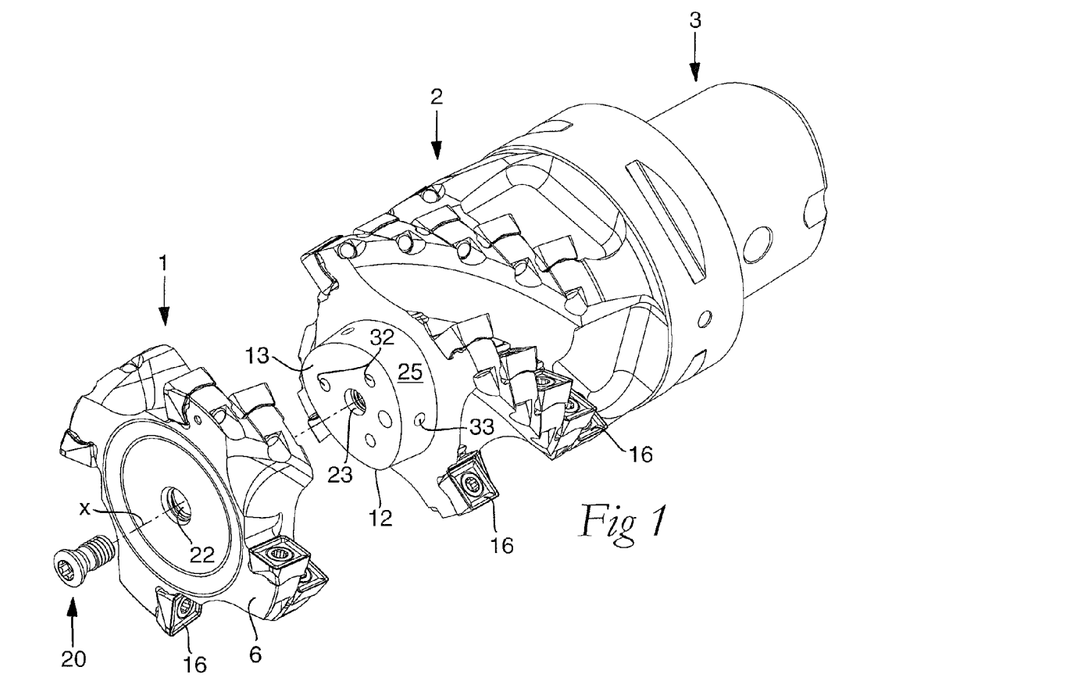
FIG. 1 is a schematic perspective view of a tool according to a first embodiment of the invention.
Figure 1A:
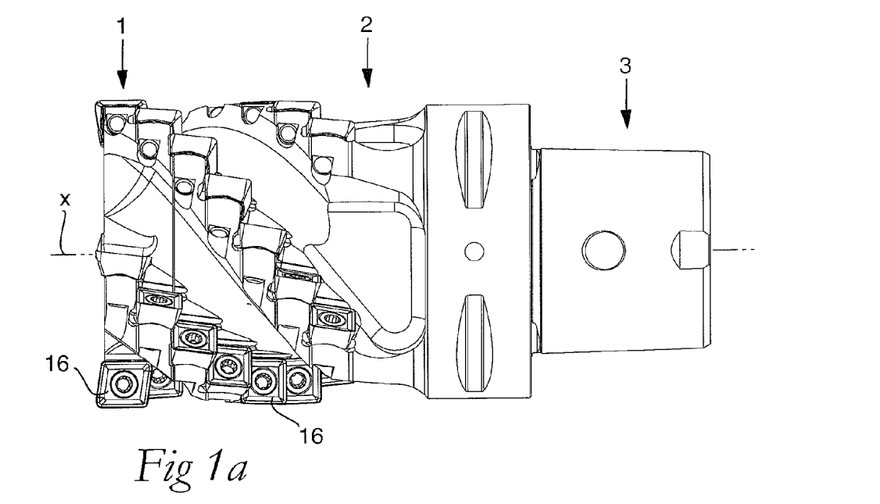
FIG. 1a is a schematic side view of the tool in FIG. 1.
Figure 2:
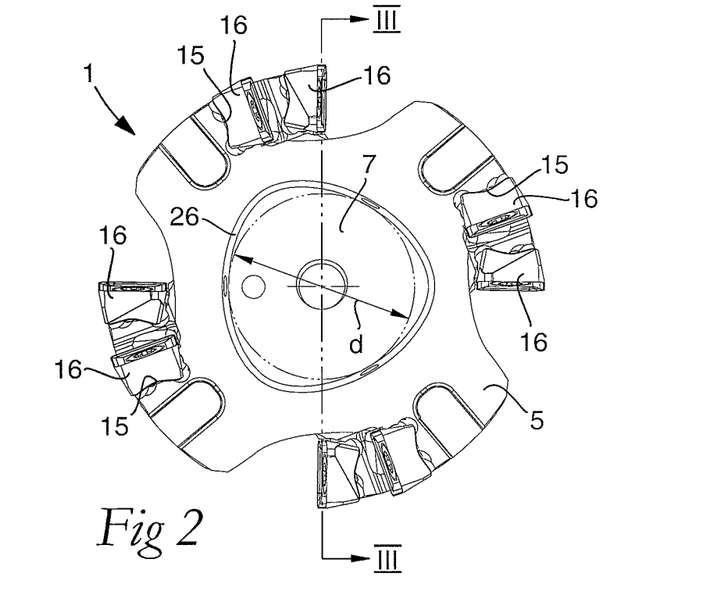
FIG. 2 is a schematic view from behind of a primary tool part of the tool in FIG. 1.
Figure 3:
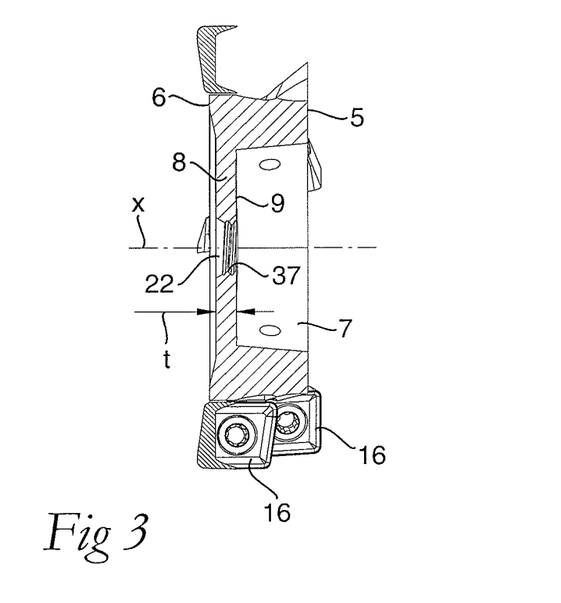
FIG. 3 is a schematic longitudinal section view along the line III-III in FIG. 2.

The primary tool part 1 has a primary connecting surface 5, see FIGS. 2 and 3, and an opposite surface 6, which in the first embodiment shown forms the distal end surface of the tool. The primary tool part 1 also has a recess 7 that extends axially from the primary connecting surface 5 toward the opposite surface 6. Accordingly, the primary tool part 1 has a wall section 8 between a bottom surface 9 of the recess 7 and the opposite surface 6.

Figure 4:
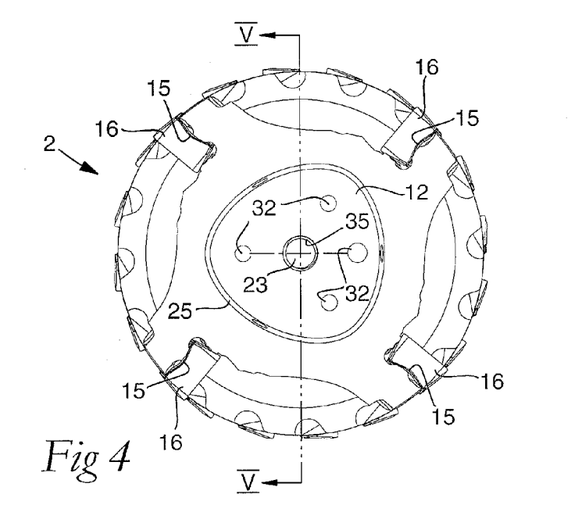
FIG. 4 is a schematic view from the front of a secondary tool part of the tool in FIG. 1.
Figure 5:
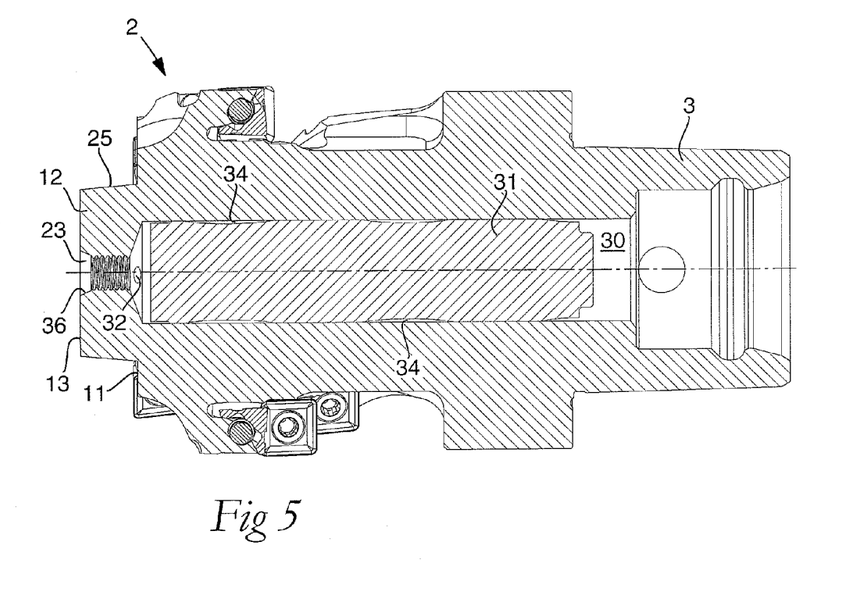
FIG. 5 is a schematic longitudinal section view along the line V-V in FIG. 4.

The secondary tool part 2, see FIGS. 4 and 5, has a secondary connecting surface 11 and a protuberance 12 that projects axially forward from the secondary connecting surface 11. The protuberance 12 is formed to extend into the recess 7 of the primary tool part 1, see FIG. 6. The protuberance 12 has a maximum diameter that is smaller than the diameter of the secondary tool part 2. The protuberance 12 has an end surface 13 that faces the bottom surface 9 of the recess 7, see FIG. 6.

It should be noted that the invention also is applicable to tools where the secondary tool part 2 including the protuberance 12 forms the end body of the tool while the primary tool part 1 including the recess 7 forms an intermediate tool body.

Accordingly, the center axis x also extends through the recess 7 of the primary tool part 1 and the protuberance 12 of the secondary tool part 2.

In the first embodiment shown, both the primary tool part 1 and the secondary tool part 2 include a plurality of seats 15 formed for the receipt of a cutting insert 16 each. The primary tool part 1 and the secondary tool part 2 may be manufactured from steel while the cutting inserts 16 normally are manufactured from a harder material, such as, for instance, cemented carbide. In the first embodiment shown, the primary tool part 1 includes at least one set of seats 15 distributed around the circumference of the primary tool part 1. The seats 15 are also distributed in a longitudinal direction parallel to the center axis x. Also the secondary tool part 2 includes at least one set of seats 15 formed for the receipt of a cutting insert 16 each and distributed around a circumference surface of the secondary tool part 2. In this case, there are several sets of seats 15 distributed in the longitudinal direction of the secondary tool part 2 parallel to the center axis x.

The tool also includes a number of chip flutes 17 that extend in a helically shaped course along the periphery of the tool, i.e., the periphery of the primary tool part 1 and the periphery of the secondary tool part 2. The seats 15, and thereby the cutting inserts 16, are arranged adjacent to said chip flutes 17.

The primary tool part 1 is detachably connectable with the secondary tool part 2. The tool includes a fastening element 20 that, by a contractive force in a mounted state, connects the wall section 8 with the protuberance 12, see FIG. 6a. In the first embodiment shown, the fastening element 20 includes a screw 21 that extends through an opening 22 of the wall section 8. The screw 21 is in engagement with a threaded hole 23 of the protuberance 12.

The wall section 8 is elastically flexible or elastically deformable. The elasticity is provided by the wall section 8 being relatively thin. The wall section 8 may have a thickness t and an inscribed diameter or greatest transversal dimension d, wherein $t/d=0.05$-$0.2$, preferably 0.08-0.18. In the first embodiment shown, the wall section 8 has an even, uniform thickness. However, it should be noted that the thickness of the wall section 8 may vary. Particularly, the thickness may be greatest in a central part of the wall section 8 around the fastening element 20 and thinner at the radially outer parts of the wall section 8. It should also be noted that the invention is applicable to tools having different dimensions. Only as examples of dimensions of the tool shown in the first embodiment, it may be mentioned that the diameter of the primary tool part 1 and secondary tool part 2 may be 60-70 mm, for instance, 64 or approx. 64 mm. The transversal dimension d may be 25-30 mm, for instance, 28 or approx. 28 mm, and the thickness t may be 2-5 mm, for instance, 3 or approx. 3 mm. The recess may have a depth of 9-13 mm, for instance, 11 or approx. 11 mm.

The protuberance 12 of the secondary tool part 2 has a circumference surface 25 that tapers toward the end surface 13. The recess 7 of the primary tool part 1 has a corresponding inner surface 26 that tapers toward the bottom surface 9. The circumference surface and the inner surface accordingly form an angle $\alpha$, see FIG. 6, with the center axis x. The angle $\alpha$ is $\leq 10°$, preferably $\geq 2°$ and $\leq 7°$, more preferably $\geq 3°$ and $\leq 6°$.

Figure 6:
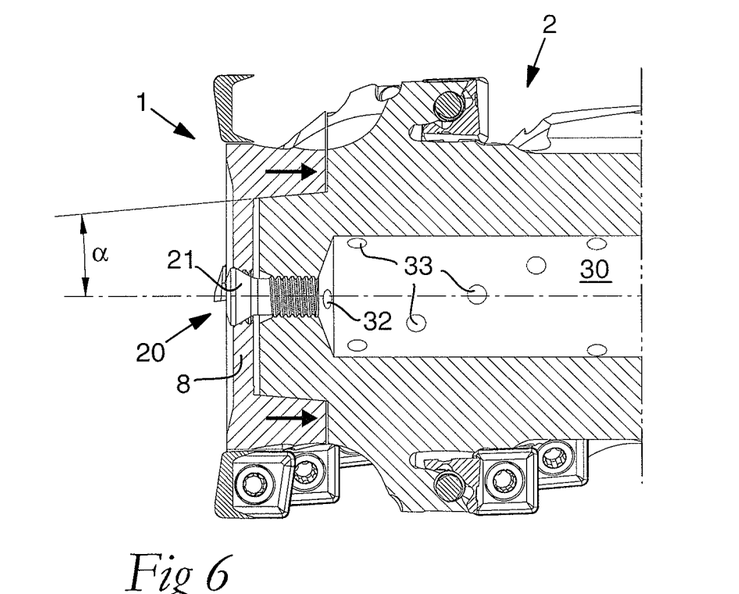
FIG. 6 is a schematic longitudinal section view through the tool in FIG. 1 with tool parts brought together.
Figure 6A:
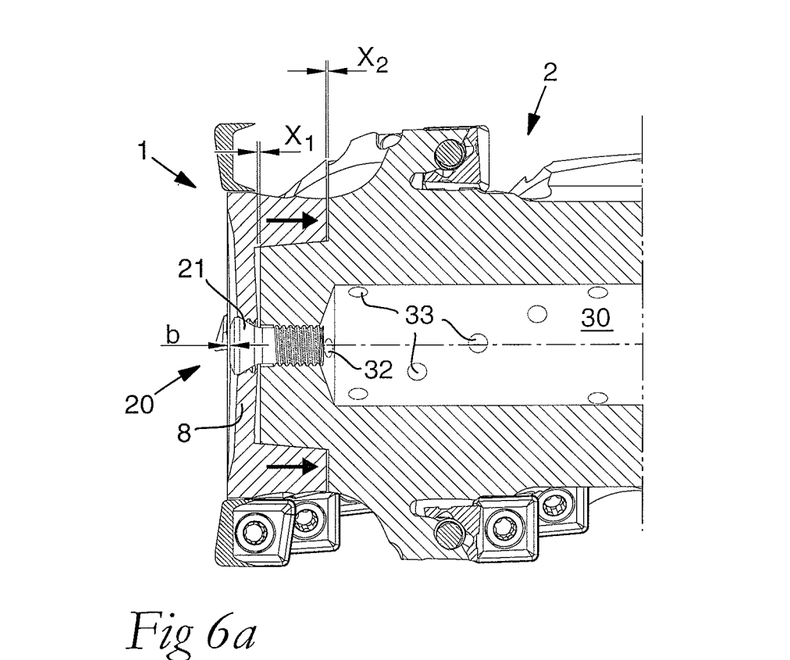
FIG. 6a is a schematic longitudinal section view similar to the one in FIG. 6 but with the tool parts in a mounted state.

When the screw 21 exerts the contractive force, which may be 3-10 kN, preferably 4-8 kN, the wall section 8 will be elastically deformed and bent toward the end surface 13 of the protuberance 12, see FIG. 6a. It is important that the primary tool part 1 and the wall section 8 are formed in such a way that no plastic deformation is created by the contractive force. The incurvation b, or the arching or the bulging, of the wall section 8 is not greater than that a first gap x1 between the end surface 13 and the bottom surface 9 is formed in the mounted state. The first gap x1 varies over the surface of the wall section 8 and has a smallest value where the incurvation b is greatest. Maximum incurvation b is obtained in the central part of the wall section 8, i.e., closest around the fastening element 20. The incurvation b of the wall section 8 may be 0.015-0.15 mm, preferably 0.02-0.1 mm.

In the mounted state, the primary connecting surface 5 faces the secondary connecting surface 11, there being formed a second gap x2 between the primary connecting surface 5 and the secondary connecting surface 11. The first gap x1 is advantageously always greater than the second gap x2, i.e., x1>x2, which means that the smallest value of the first gap x1 should be greater than the second gap x2. In such a way, a prestress is ensured on the fastening element 20 even if the gap x2 would approach zero.

Due to the elastic wall section, the tool parts will be pressed against each other under all operation conditions, i.e., in all temperatures occurring in use. Thereby, it is avoided that the fastening element comes loose, or is poorly secured, as a consequence of expansion or contraction of the material of the tool parts because of temperature variations. Here, it should also be noted that the shown design with the first gap x1 and the second gap x2 results in the fact that the primary tool part 1 and the secondary tool part 2 in the mounted state, see FIG. 6a, will abut against each other only by the tapering or conical circumference surface 25 of the protuberance 12 and the tapering or conical inner surface 26 of the recess 7.

During use of the tool, the primary tool part 1 will normally become warmer than the secondary tool part 2. This means that the primary tool part 1 and the recess 7 expand more than the secondary tool part 2 and the protuberance 12. Due to the tapering, or conical, shape of the recess 7 and the protuberance 12, a certain small relative axial motion can be allowed at the same time as the primary tool part 1 is reliably and fixedly connected with the secondary tool part 2. Accordingly, the gap x2 can be somewhat reduced during use. The wall section 8 is formed to allow such an elastic deformation so that a sufficient prestress is exerted on the fastening element 20 during all use of the tool.

Furthermore, the protuberance 12 and the recess 7 have a non-circular shape in a cross-section in respect of the center axis x. The non-circular shape includes or may be a polygon-like shape, and in the first embodiment shown, the cross-sectional shape is a triangle-like shape, see FIGS. 2 and 4. Thus, the primary and secondary tool parts 1, 2 cannot rotate in relation to each other in the mounted state.

The secondary tool part 2 includes a central cavity 30, which is formed for the receipt of a damping mechanism 31, for instance of the type shown in WO2008/002145. Due to the relatively short fastening element 20, the damping mechanism 31 can be arranged relatively far forward in the tool, i.e., relatively near the distal end surface of the tool.

Figure 7:
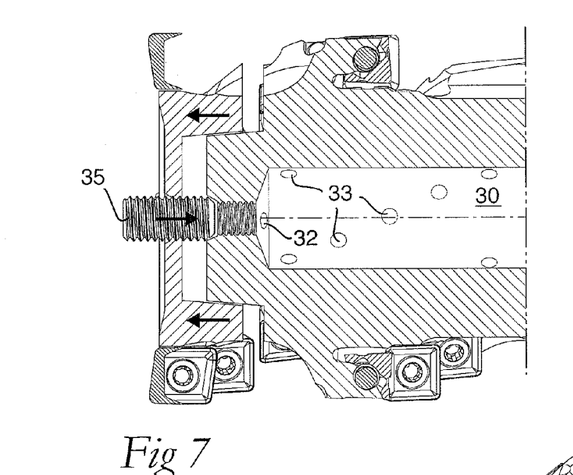
FIG. 7 is a schematic longitudinal section view through the tool in FIG. 1 during dismounting of the tool parts.

The tool includes furthermore a cooling medium duct that extends through the cavity 30 and out through one or more openings 32 through the end surface 13. The openings 32 mouth in the first gap x1 between the end surface 13 and the bottom surface 9. The cooling medium that is conveyed through the cooling duct into the first gap x1 can then be conveyed further through suitable passages 33, see FIG. 2, to the cutting inserts or areas that are to be cooled. As is seen in FIG. 5, the damping mechanism 31 has a circumference surface that is provided with two helically shaped grooves 34. The cooling medium that is supplied through the cooling medium duct is accordingly conveyed in the cavity 30 in the helically shaped grooves 34 up to the openings 32 and passages 33. As is seen in FIGS. 5-7, there are also passages 33 for cooling medium from the helically shaped grooves 34 through the secondary tool part 2 and out to the cutting inserts 16 and areas that are to be cooled at the outer circumference of the secondary tool part 2. It should be noted that the damping mechanism 31 can include one or more grooves 34. The grooves 34 do not have to be helically shaped but may extend straight axially.

In order to facilitate dismounting of the tool parts 1, 2, i.e., pulling off of the primary tool part 1 from the secondary tool part 2, the opening 22 of the wall section 8 is provided with an internal thread 37 that has a diameter that is greater than the diameter of the threaded hole 23 of the protuberance 12. Accordingly, the opening 22 of the wall section 8 is formed for the receipt of a puller screw 35, see FIG. 7. The protuberance 12 has also an abutment surface 36 arranged around the threaded hole 23 and formed to form abutment surface for the puller screw 35. By the fact that the puller screw 35 is screwed into the opening 22 into abutment against the abutment surface 36, the primary tool part 1 will accordingly be pressed outward away from the secondary tool part 2, and the tool can be dismounted in a simple way. The above-mentioned greater thickness of the central part of the wall section 8 may be advantageous to ensure a sufficient length of the internal thread 37.

Figure 8:
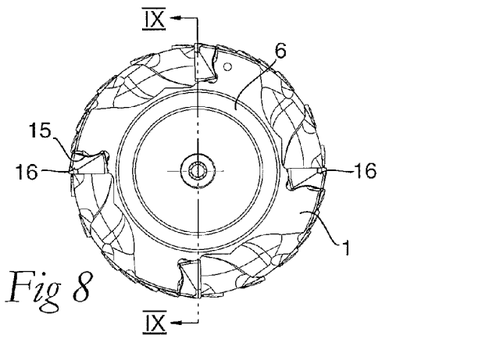
FIG. 8 is a schematic view from the front of a tool according to a second embodiment of the invention.
Figure 9:
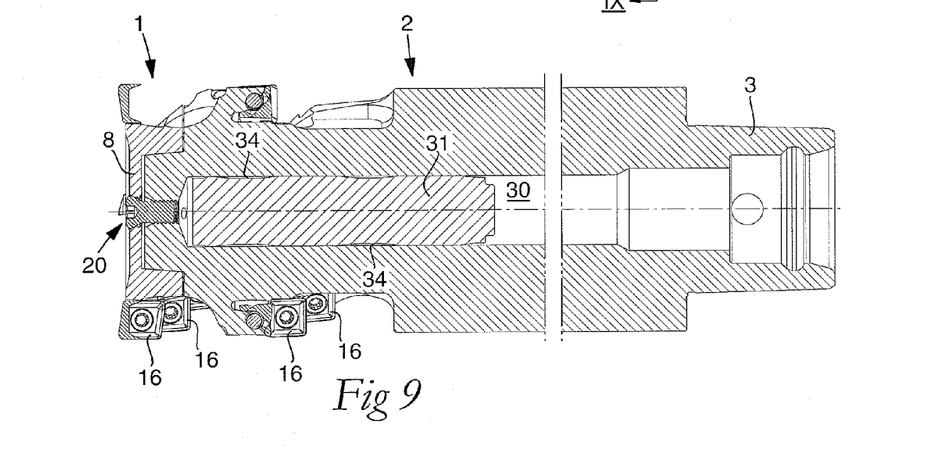
FIG. 9 is a schematic longitudinal section view of the tool in FIG. 8.

FIGS. 8 and 9 show a second embodiment that differs from the first embodiment only in that it illustrates another, somewhat modified type of milling tool having an essentially longer axial extension. Elements having the same or corresponding function have been provided with the same reference designations in the embodiments shown. It should be noted that the secondary tool part 2 of the second embodiment may include considerably more seats 15 and cutting inserts 16 than what is shown in FIGS. 8 and 9.

While the invention has been disclosed with reference to certain preferred embodiments, numerous modifications, alterations, and changes to the described embodiments are possible without departing from the sphere and scope of the invention, as defined in the appended claims and their equivalents thereof. For instance, it should be noted that according to an alternative embodiment, the gap x2 may be very small and approach zero or even be equal to zero. Thanks to the elastically deformable wall section 8 and that x1>0, also in this case, a sufficiently rigid joint can be achieved. According to another alternative embodiment, the tool may comprise more than the tool parts shown, for instance, one or more additional primary tool parts. Then, the fastening element 20 may extend through all the primary tool parts but only the outermost, distal primary tool part comprises an elastically deformable wall section 8. Accordingly, it is intended that the invention not be limited to the described embodiments, but that it have the full scope defined by the language of the following claims.

What is claimed is:

1. A tool for chip removing machining, comprising:
a primary tool part including a primary connecting surface, an opposite surface, a recess that extends from the primary connecting surface toward the opposite surface, and a wall section between a bottom surface of the recess and the opposite surface;
a secondary tool part including a secondary connecting surface, a protuberance that extends from the secondary connecting surface and, in a mounted state, into the recess, the protuberance having an end surface that, in the mounted state, faces the bottom surface of the recess;
a shaft part for fixing in a machine tool;
a fastening element, which, by a contractive force in the mounted state, connects the wall section with the protuberance;
a center axis extending in a longitudinal direction of the tool through the primary tool part, the recess, the secondary tool part, the protuberance, and the shaft part; and
an insert seat formed in at least one of the primary tool part and the secondary tool part for receiving a cutting insert, wherein the wall section has a wall thickness t and a greatest transversal dimension d, where t/d equals 0.05 to 0.2 and the wall section is elastically flexible and, in the mounted state, bent toward the end surface of the protuberance by the contractive force of the fastening element.

2. A tool for chip removing machining, comprising:
a primary tool part including a primary connecting surface, an opposite surface, a recess that extends from the primary connecting surface toward the opposite surface, and a wall section between a bottom surface of the recess and the opposite surface;
a secondary tool part including a secondary connecting surface, a protuberance that extends from the secondary connecting surface and, in a mounted state, into the recess, the protuberance having an end surface that, in the mounted state, faces the bottom surface of the recess;
a shaft part for fixing in a machine tool;
a fastening element, which, by a contractive force in the mounted state, connects the wall section with the protuberance;
a center axis extending in a longitudinal direction of the tool through the primary tool part, the recess, the secondary tool part, the protuberance, and the shaft part;

an insert seat formed in at least one of the primary tool part and the secondary tool part for receiving a cutting insert; and a first gap between the end surface of the protuberance and the bottom surface of the recess in the mounted state, wherein the wall section is elastically flexible and, in the mounted state, bent toward the end surface of the protuberance by the contractive force of the fastening element, and wherein the primary connecting surface, in the mounted state, faces the secondary connecting surface, the primary tool part and the secondary tool part being dimensioned in such a way that there is formed a second gap between the primary connecting surface and the secondary connecting surface in the mounted state.

3. A tool for chip removing machining, comprising:

a primary tool part including a primary connecting surface, an opposite surface, a recess that extends from the primary connecting surface toward the opposite surface, and a wall section between a bottom surface of the recess and the opposite surface;

a secondary tool part including a secondary connecting surface, a protuberance that extends from the secondary connecting surface and, in a mounted state, into the recess, the protuberance having an end surface that, in the mounted state, faces the bottom surface of the recess;

a shaft part for fixing in a machine tool;

a fastening element, which, by a contractive force in the mounted state, connects the wall section with the protuberance;

a center axis extending in a longitudinal direction of the tool through the primary tool part, the recess, the secondary tool part, the protuberance, and the shaft part; and an insert seat formed in at least one of the primary tool part and the secondary tool part for receiving a cutting insert, wherein the wall section is elastically flexible and, in the mounted state, bent toward the end surface of the protuberance by the contractive force of the fastening element, wherein the fastening element comprises a screw that extends through an opening of the wall section and is in engagement with a threaded hole of the protuberance, and wherein the opening of the wall section is provided with an internal thread, which has a diameter that is greater than the diameter of the threaded hole and which is formed for the receipt of a puller screw.

4. The tool according to claim 3, further comprising a first gap between the end surface of the protuberance and the bottom surface of the recess in the mounted state.

5. The tool according to claim 2 or 3, wherein the protuberance has a circumference surface that tapers toward the end surface and the recess has a corresponding inner surface that tapers toward the bottom surface, the circumference surface and the inner surface forming an angle $\alpha$ with the center axis.

6. The tool according to claim 5, wherein the angle $\alpha$ is between 2° and 7°.

7. The tool according to claim 2 or 3, wherein the protuberance and the recess have a non-circular shape in a cross-section in respect of the center axis.

8. The tool according to claim 7, wherein the non-circular shape comprises a polygon-like shape.

9. The tool according to claim 2, wherein the fastening element comprises a screw that extends through an opening of the wall section and is in engagement with a threaded hole of the protuberance.

10. The tool according to claim 3, wherein the protuberance has an abutment surface arranged around the threaded hole for the puller screw.

11. The tool according to claim 2 or 3, wherein the shaft part is formed integrally with or connected with the secondary tool part.

12. The tool according to claim 11, wherein the secondary tool part comprises a central cavity formed for the receipt of a damping mechanism.

13. The tool according to claim 12, wherein the tool comprises a cooling medium duct that extends through at least the cavity and out through an opening through the end surface.

14. The tool according to claim 2 or 3, wherein the primary tool part comprises at least one set of seats formed for the receipt of a cutting insert each and distributed around a circumference surface of the primary tool part.

15. The tool according to claim 2 or 3, wherein the secondary tool part comprises at least one set of seats formed for the receipt of a cutting insert each and distributed around a circumference surface of the secondary tool part.

16. The tool according to claim 4, wherein the primary connecting surface, in the mounted state, faces the secondary connecting surface, the primary tool part and the secondary tool part being dimensioned in such a way that there is formed a second gap between the primary connecting surface and the secondary connecting surface in the mounted state.

* * * * *